United States Patent [19]

Osawa

[11] Patent Number: 5,137,371
[45] Date of Patent: Aug. 11, 1992

[54] LINEAR GUIDE TABLE SYSTEM
[75] Inventor: Nobuyuki Osawa, Takasaki, Japan
[73] Assignee: Nippon Seiko Kabushiki Kaisha, Tokyo, Japan
[21] Appl. No.: 701,104
[22] Filed: May 16, 1991
[30] Foreign Application Priority Data
  May 18, 1990 [JP] Japan .................. 2-52037[U]
[51] Int. Cl.$^5$ .............................. F16C 29/06
[52] U.S. Cl. ..................................... 384/45
[58] Field of Search ................... 384/45, 43, 44; 464/168

[56] References Cited
U.S. PATENT DOCUMENTS
4,692,037  9/1987  Kasai ..................... 384/45
4,918,846  4/1990  Tsukada ................. 384/45
5,005,987  4/1991  Morita ................... 384/45

FOREIGN PATENT DOCUMENTS
62-11208  3/1987  Japan .

Primary Examiner—Lenard A. Footland
Attorney, Agent, or Firm—Basile and Hanlon

[57] ABSTRACT

A linear guide table system includes a pair of linear guide apparatuses connected in parallel to each other by a common table fixed to upper surfaces of sliders of the pair of linear guide apparatuses. Each slider of the pair of linear guide apparatus has an inverted L1-shaped cross section and has side walls. In each slider, one ball rolling groove is formed in a lower portion of an inner surface of one of the side walls, and one ball rolling grooves is formed in an upper portion of an inner surface of the other of the side walls thereby to form the ball rolling grooves asymmetrically with respect to a vertical plane containing a longitudinal axis.

2 Claims, 4 Drawing Sheets

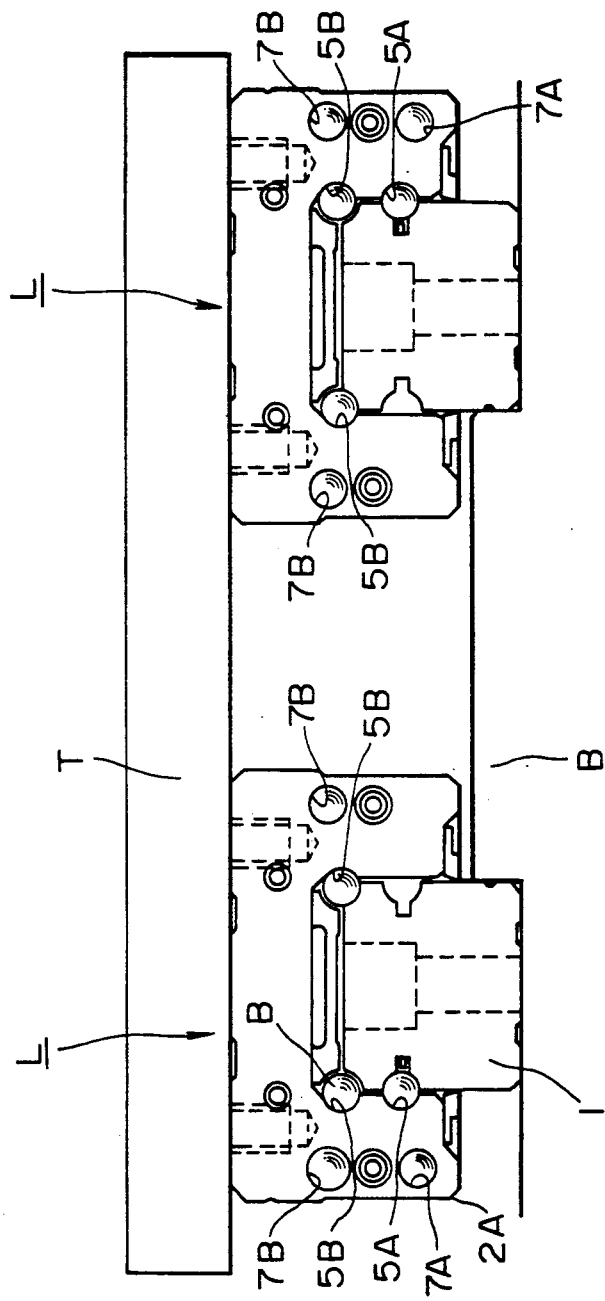

LINEAR GUIDE TABLE SYSTEM

BACKGROUND OF THE INVENTION

1. Field of the Invention

The present invention relates to a linear guide table system including a pair of linear guide apparatuses respectively having sliders which are movable linearly by being guided by guide rails, and including a common table fixed to upper surfaces of the sliders.

2. Description of the Prior Art

A prior art linear guide table system of this type is disclosed, for example, in Japanese Patent Publication No. 62-11208. The linear guide table system includes a pair of linear sliding bearings (linear guide apparatuses) and a table fixed to upper surfaces of sliders across the sliders. The slider has an inverted C-shaped cross section and has a recess opening downwardly. One side wall of the slider has an upward slant surface formed in an upper portion of an inner surface, and the other side wall of the slider has a downward slant surface formed in an inner surface. Load ball grooves extending in a longitudinal direction and having a semicircular cross section are respectively formed in the upward slant surface and in the downward slant surface, and no-load ball holes extending in the longitudinal direction are respectively formed in both side walls.

On the other hand a guide rail of each linear guide apparatus has a cross section of at least an upper portion substantially the same as the shape of the recess portion of the slider. The guide rail has a downward slant surface formed by cutting out one side surface in substantially an L shape, and a downward rolling groove having a semicircular cross section and extending in the longitudinal direction is formed in the downward slant surface. Furthermore, a shoulder portion of the other side of the guide rail is cut out to form an upward slant surface, and an upward rolling groove having a semicircular cross section and extending in the longitudinal direction is formed in the upward slant surface.

In this prior art system, the number of the load ball grooves of the slider, and the number of the ball rolling grooves of the guide rail of the linear guide apparatus can be reduced for each side from two to one. As a result, the working cost can be reduced.

However, in this prior art system, the upward slant surface and the downward slant surface are respectively formed in the inner side of the slider and in the outer side of the guide rail, and one load ball groove and one ball rolling groove are formed respectively in the upward and downward slant surfaces. As a result, the shapes of the cross sections of the slider and the guide rail are not in bilateral symmetry and are complicated. Thus, there is a problem in that it is impossible to additionally form the load ball groove and the ball rolling groove to increase the number of grooves to two grooves for each side thereby to enable to use for general purpose.

SUMMARY OF THE INVENTION

The present invention was made in view of the problem in the prior art, and it is an object of the invention to provide a linear guide table system including linear guide apparatuses which is easily worked additionally to form a structure which is capable of receiving loads as a unitary body from any directions vertically and laterally, and which can be used for a general purpose.

A linear guide table system in the present invention comprise a pair of linear guide apparatuses connected to each other by a common table which is fixed to upper surfaces of sliders of the linear guide apparatuses. Each linear guide apparatus includes a guide rail having a substantially square cross section and having a plurality of rolling member rolling grooves extending in an axial direction and formed in each of side surfaces, a slider main body having a substantially inverted U-shaped cross section and movably straddling the guide rail, the slider main body having a predetermined number of rolling member rolling grooves respectively opposing corresponding rolling member rolling grooves of the guide rail and formed in an inner surface of each side wall and having a plurality of rolling member return passages respectively in parallel to the rolling member rolling grooves of the slider main body, end caps respectively joined to opposite ends of the slider main body, each of the end caps having curved passages for respectively bringing the rolling member return passages in communication with the rolling member rolling grooves, and a multiplicity of rolling members rollably inserted into the opposing rolling member rolling grooves. The slider main body is formed with the predetermined number of rolling member rolling grooves so that one rolling member rolling groove is formed in the inner surface of one of the side walls and one or more rolling member rolling grooves are formed in the inner surface of the other of the side walls in bilateral asymmetry.

The rolling member rolling grooves of the slider main body may be formed so that one rolling member rolling groove is formed in the inner surface of one of the side walls and two rolling member rolling grooves are formed in the inner surface of the other of the side walls.

As the guide rail of the linear guide apparatus, a standard type guide rail having a square cross section and having a predetermined number of rolling member rolling grooves formed respectively in outer side surfaces is used. Accordingly, as compared with the case wherein a non-standard guide rail having a different shape is used, the manufacturing cost of the linear guide apparatus is low and the linear guide apparatus is suitable for a general purpose.

On the other hand, as the slider main body, a standard type slider main body having an inverted U-shaped cross section is used, and further, a minimum number of necessary rolling member rolling grooves are formed. Namely, one rolling member rolling groove is formed by grinding in the inner surface of one of the side walls and one or more rolling member rolling grooves are formed by grinding in the inner surface of the other of the side walls. As a result, the working cost can be reduced.

BRIEF DESCRIPTION OF THE DRAWINGS

FIG. 7 is a side view of a whole linear guide table system of still another embodiment of the present invention.

DESCRIPTION OF THE PREFERRED EMBODIMENTS

Figure 1:
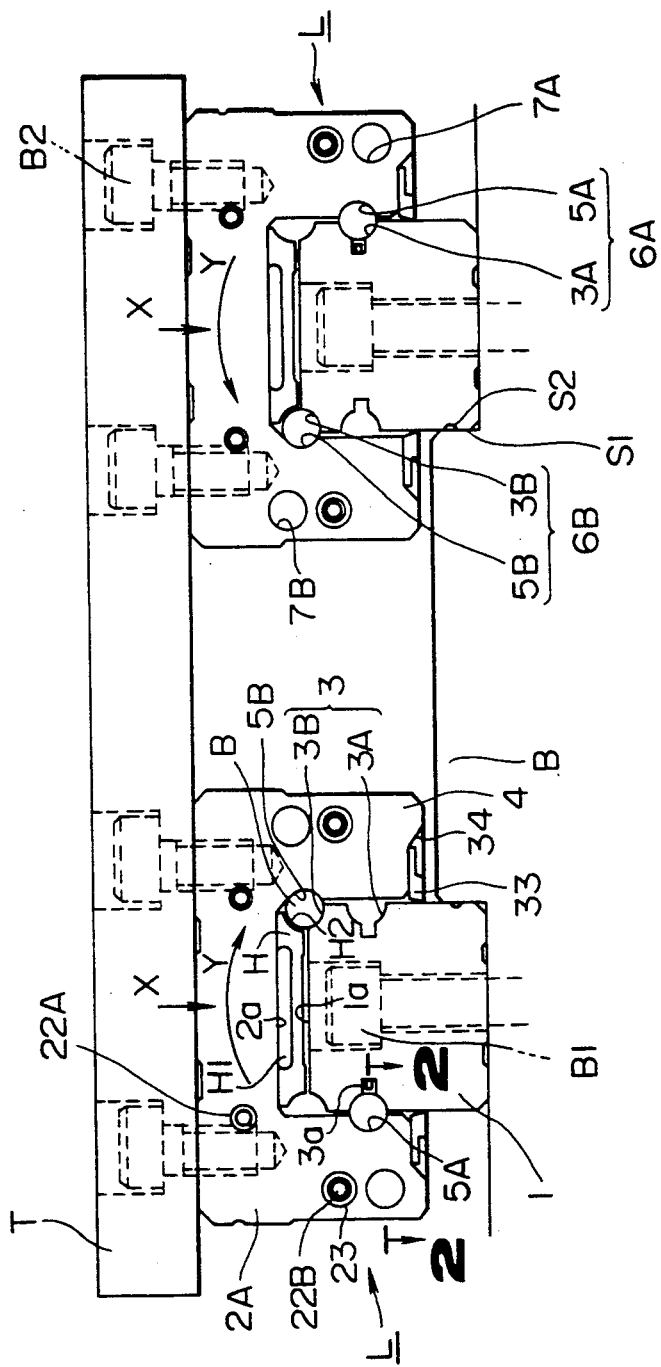
FIG. 1 is a side view of a whole linear guide table system with end caps removed of an embodiment of the present invention.

FIGS. 1 to 5 show an embodiment of the present invention. As shown in FIG. 1, a linear guide table system includes a pair of linear guide apparatuses L secured on a bed B by rail fixing bolts B1 in parallel to each other, and a common table T connecting the pair of linear guide apparatuses L. Each of the pair of linear guide apparatuses L includes a guide rail 1 which is secured to the bed B by the rail fixing bolt B1, and a slider 2 having a substantially inverted U-shaped cross section and movably straddling the guide rail 1. The common table T is fixed to upper surfaces of the sliders 2 by fixing bolts B2.

The guide rail 1 of the linear guide apparatus L in this embodiment is of a standard type which has a substantially square cross section and has two ball rolling grooves 3A, 3B extending in an axial direction and formed in an outer side surface of each lateral side. Thus, a total of four ball rolling grooves are formed in both lateral sides of the guide rail 1. The lower ball rolling groove 3A in each lateral side has a substantially semicircular cross section, however, the upper ball rolling groove 3B is formed in each ridge formed between an upper surface and a lateral side surface, and has a ¼ circular cross section. In a bottom of the lower ball rolling groove 3A, a relief groove 3a of a wire retainer W is formed along the axial direction. The wire retainer W prevents balls B from falling off.

On the other hand, balls B in the upper ball rolling groove 3B are held by a ball retainer H which is attached to a lower surface 2a of a recessed portion of the slider 2. The lower surface 2a confronts an upper surface 1a of the guide rail 1. This ball retainer H was previously proposed by the applicant (Japanese Utility Model Laid-Open Publication No. 1-174282), and it is an injection mold product of plastic having a rectangular frame shape. Both side edges of the ball retainer H have a thickness and a width suitable to be strained inwardly in a curved shape by elastic deformation. The ball retainer H has ball holding grooves H2 of a circular arc cross section are formed in outer surfaces of both the side edges to extend over a whole length, and the ball holding grooves H2 hold the balls in the ball rolling grooves 3B of the slider 2. The ball retainer H is fixed to end caps 8 which are joined to opposite ends of the slider 2 in such that engaging portions H1 of the ball retainer H are fitted into recesses H4 (FIG. 4) formed in joining end surfaces 8a of the end caps 8. The balls B in the ball rolling groove 3B are held by the ball holding grooves H2 by an elastic force imparted to the balls B.

In both side walls 4 of the main body 2A of the slider 2, a ball rolling groove 5A opposing the lower ball rolling groove 3A of the guide rail 1 is formed in an inner surface of one of the side walls 4, and a ball rolling groove 5B opposing the upper ball rolling groove 3B of the guide rail 1 is formed in an inner surface of the other of the side walls 4. By these opposing ball rolling grooves 3A and 5A, and 3B and 5B, a lower ball rolling passage 6A and an upper ball rolling passage 6B are formed so that these ball rolling passages 6A and 6B are respectively disposed at different levels of an upper position and a lower position. As the slider main body 2A, a standard type slider main body is used, in which the ball rolling grooves of the inner surfaces have not yet worked (in the case of a standard product, two ball rolling grooves are formed in each inner surface of both the side walls, and thus, a total of four ball rolling grooves are formed respectively corresponding to the upper and lower ball rolling grooves 5B, 5A of the guide rail 1), and it is only necessary to work a minimum required number of ball rolling grooves.

Furthermore, in both the side walls 4 of the slider main body 2A, there are formed with a ball return passage hole 7A penetrating axially a thick wall portion of one side wall 4 in parallel to the lower ball rolling passage 6A, and a ball return passage hole 7B penetrating axially a thick wall portion the other side wall 4 in parallel to the upper ball rolling passage 6B (in the case of a standard product, two ball return passages are formed in each of the side walls, and thus, a total of four ball return passages are formed).

Figure 2:
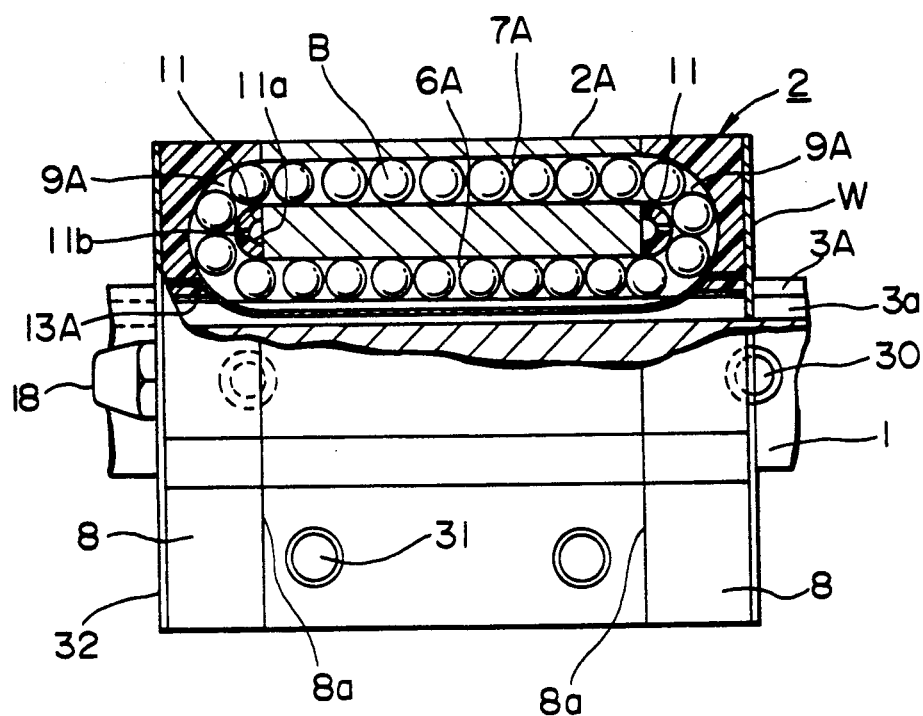
FIG. 2 is a plan view of the linear guide apparatus with a part in sectional view taken along the line II—II in FIG. 1.
Figure 3:
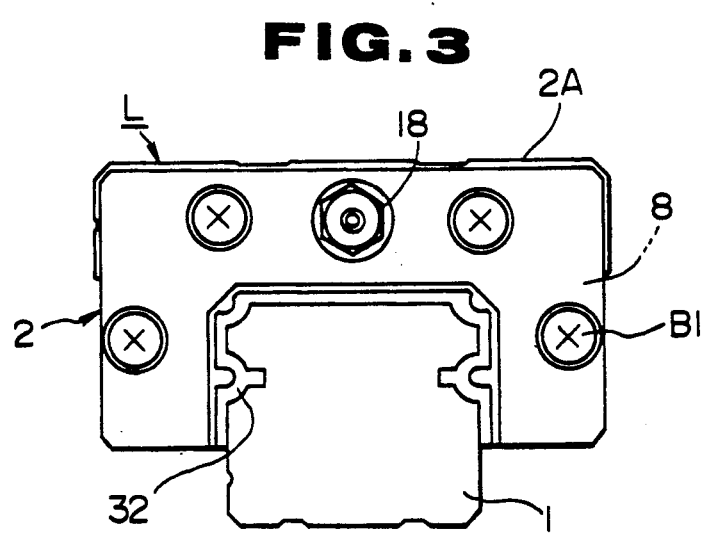
FIG. 3 is a side view of the linear guide apparatus of FIG. 1 with the end cap mounted.
Figure 4:
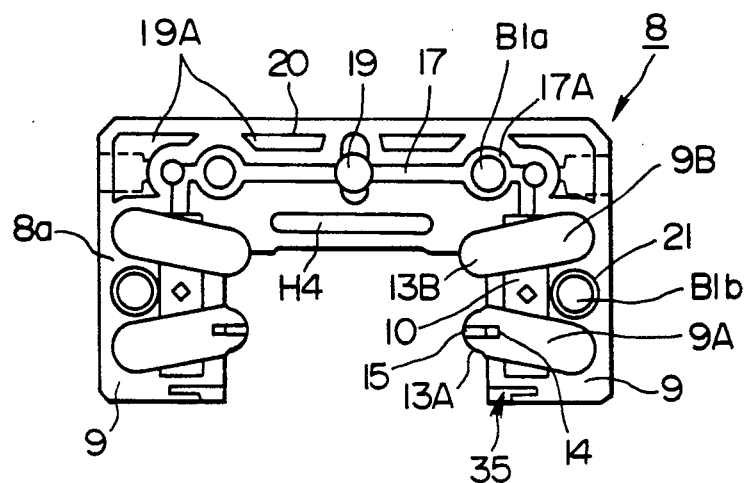
FIG. 4 is a rear view of the end cap of FIG. 3.
Figure 5:
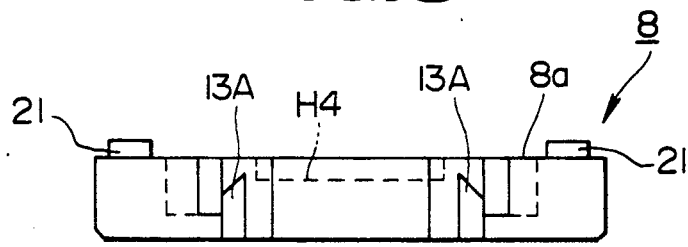
FIG. 5 is a bottom view of the end cap of FIG. 3.

As shown in FIG. 2, the end caps 8 which are injection mold products of a synthetic resin are respectively joined to the opposite ends of the slider main body 2A. Each of the end caps 8 is, as shown in FIGS. 3 to 5, a standard product having a substantially inverted U-shaped cross section, and two pairs of semicircular curved passages 9A and 9B are formed in bilateral symmetry in side leg portions 9 of a joining end surface 8a which is joined to an end surface 2a of the slider main body 2A. One curved passage 9A brings the lower ball rolling passage 6A in communication with the ball return passage hole 7A, and one curved passage 9B brings the upper ball rolling passage 6B in communication with the ball return passage hole 7B. Accordingly, the other curved passage 9A, and the other curved passage 9B among the two pairs of curved passages are idling.

The end cap 8 is further formed in each leg portion 9 with a half-column-shaped recessed groove 10 which passes across center portions of the upper and lower curved passages 9B and 9A vertically as shown in FIG. 4. As shown in FIG. 2, a return guide 11 is fitted in the recessed groove 10 so that the curved passages 9A and 9B are formed in a half doughnut shape. An oil path groove 11a is formed by an inner peripheral surface of the return guide 11, and a through hole 11b is formed between the oil path groove 11a and an outer peripheral surface of the return guide 11.

As shown in FIGS. 2, 4 and 5, ball scooping projections 13A and 13B protruding inwardly in a semicircular shape are formed at inner end portions of the curved passages 9A and 9B, and extreme ends of the ball scooping projections 13A and 13B having an acute angle are respectively loosely fitted to the ball rolling grooves 3A and 3B of the guide rail 1. Furthermore, a wire holding hole 14 is formed in a base portion of each of the ball scooping projections 13A and 13B to hold the wire retainer W with end portions of the wire retainer W inserted into the wire holding holes 14. A wire relief groove 15 is formed which connects the extreme end of each of the ball scooping projections 13A and 13B to the wire holding hole 14.

In the joining end surface 8a of the end cap 8, a feed oil groove 17 is formed to bring the recessed grooves 10 and 10 respectively formed in both the leg portions 9 of the end cap 8 in communication with each other, and the feed oil groove 17 is in communication with a attaching hole 19 of a feed oil nipple 18. Inserting holes B1a and B1b for fixing screws B1 to fix the end cap 8 to the slider main body 2A are formed in the end cap 8, and the inserting holes B1a which penetrates the feed oil groove 17 is formed with a spot facing so as to form a feed oil groove 17a of an annular shape. Thus, a lubricating oil is allowed to pass around the fixing screw B1. Thickness reduced portions 19A are formed in a land of the feed oil groove 17.

A guide projection 21 is formed at a joining side end of the inserting holes B1b of the leg portion 9 of the end cap 8, and this guide projection 21 is fitted into a joining recess 23 formed in a screw hole 22B among screw holes 22A and 23B which are formed in the end surface 2a of the slider main body 2A. Owing to this arrangement, the joining accuracy between the end cap 8 and the slider main body 2A can be insured, and the curved passage 9A (9B) can be connected to the lower ball rolling passage 6A (upper ball rolling passage 6B) and to the ball return passage hole 7A (7B) of the slider main body 2A without causing stepped portions at the joining portions.

An infinitely circulating route is formed by the lower ball rolling passage 6A, the curved passage 9A, and the ball return passage hole 7A, and another infinitely circulating route is formed by the upper ball rolling passage 6B, the curved passage 9B, and the ball return passage hole 7B. The balls B are inserted as rolling members in the infinitely circulating routes as shown in FIG. 2.

Furthermore, with reference to FIG. 2, through holes 30 of the bolts B1 are formed in the guide rail 1 to secure the guide rail 1 of the linear guide apparatus L to the base B, and screw holes 31 are formed in the slider 2 to secure the table T to the slider 2. A side seal 32 is fixed to the end cap 8 to wipe the ball rolling grooves 3A and 3B of the guide rail 1 to prevent the intrusion of foreign matters. With reference to FIG. 1, an under seal 33 is accommodated in a recess 34 at a lower end of the side wall 4 of the slider main body 2A, and the under seal 33 is held with its opposite ends fitted into under seal attaching recesses 35 (FIG. 4) of the leg portion 9 of the end cap 8

In assembling the linear guide table system, one of the guide rails 1, that is, the guide rails 1 at a reference side (e.g., the right hand one) is secured to the bed B with the slider 2 fixed to the guide rail 1, and then, the other guide rail 1 at an adjusting side and the associated slider 2 are fixed after fine adjustment. Specifically, a lateral reference surface S1 of the reference side guide rail 1 with the slider 2 mounted thereon is pressed against a reference surface S2 of the bed B, and the guide rail 1 is secured to the bed B by the bolt B1. Then the adjusting side guide rail 1 is secured to the bed B while checking the parallelism and the squareness of the reference side guide rail 1. Subsequently, the sliders 2 are positioned at a predetermined interval, and the table T is placed on the sliders 2. The table T is fixed to the reference side slider 2 by the fixing bolt B2, and then the table T is fixed to the adjusting side slider 2. Since each guide rails 1 is in bilateral symmetry, the two guide rails 1 may be disposed in any axial direction. However, since each slider 2 is in bilateral asymmetry, as shown in FIG. 1, the left hand slider 2 and the right hand slider 2 are disposed with their axial directions oppositely.

Once the linear guide table system is assembled as mentioned above, the loads can be beared vertically and laterally as shown by the arrows X and Y.

In operation, when the table T is moved in an axial direction, in each linear guide apparatus L, the balls B inserted in the lower ball rolling passage 6A and the upper ball rolling passage 6B are moved while rolling with the movement of the slider 2. At an end of the slider 2, the balls B are guided by the ball scooping projection 13A (13B) provided on the end cap 8 to change the direction of movement. Thus, the balls B make a U-turn along the curved passage 9A (9B). Subsequently, the balls B pass through the ball return passage hole 7A (7B) of the slider main body 2A, and make again a U-turn by the curved passage 9A (9B) of the end cap 8, and return to the lower ball rolling passage 6A (upper ball rolling passage 6B). In this manner the balls B repeat circulation while rolling and moving continuously.

In this embodiment, as the guide rail 1 of the linear guide apparatus, a standard product as it is is diverted to the purpose of the guide rail 1, and as the slider 2, an original part of a standard product can be used with a required minimum working for the grooves. As a result, the material cost and the manufacturing cost can be reduced to a great extent.

Figure 6:
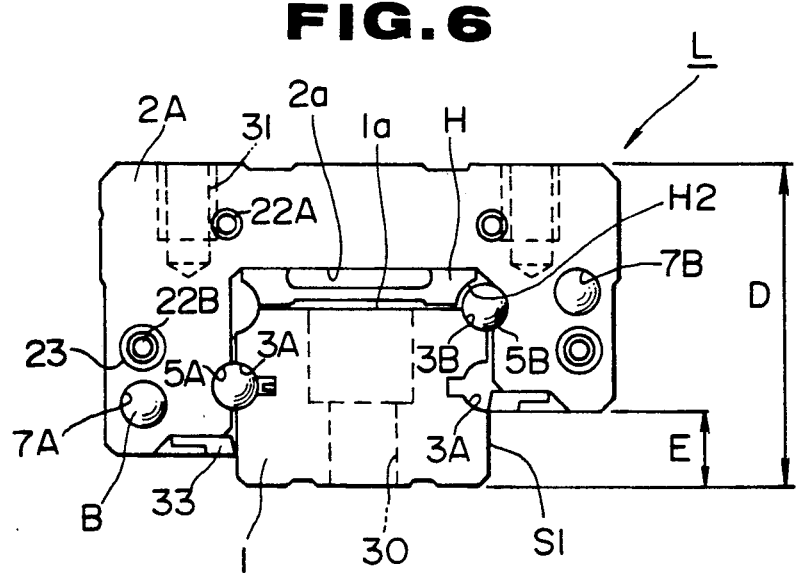
FIG. 6 is a side view of a linear guide apparatus of another embodiment of the present invention.

Another embodiment will be described with reference to FIG. 6. In this embodiment, the height of the guide rail 1 of the linear guide apparatus L is reduced, and at the same time, one side wall of the slider 2 is cut to a short length. By this additional working, a height E of the rail lateral reference surface S1 is retained with a sufficient height, and also, a height D of the assembly is reduced. In this case, the guide rail 1 may be formed with a short height from the beginning instead of additionally working the standard product.

FIG. 7 shows still another embodiment. In this embodiment, two ball rolling grooves 5A and 5B are formed in one side wall of the slider 2 in each linear guide apparatus L, and one ball rolling grooves 5B is formed in the other side wall of the slider 2.

In each of the embodiments, although the balls are employed as rolling members, the present invention is also applicable to a linear guide apparatus in which rollers are used as the rolling members.

As described in the foregoing, in the present invention, as the rolling member rolling grooves of a slider main body of a linear guide apparatus used in a linear guide table, one rolling member rolling groove is formed in one side wall, and one or more rolling member rolling grooves are formed in the other side wall of the slider main body. By virtue of this structure, an advantage is provided in that an original part of a standard product intended for general purpose can be utilized with a required minimum working, and thus, the linear guide table of the invention is suitable for general purpose and the manufacturing cost can be reduced.

What is claimed is:

1. A linear guide table system comprising:
   a pair of linear guide apparatuses; and
   a common table connecting the pair of linear guide apparatuses in parallel to each other;
   each of the pair of linear guide apparatuses comprising:
      a guide rail having a substantially square cross section and a plurality of rolling member rolling grooves extending in an axial direction and formed in each of the side surfaces thereof;
      a slider main body having a substantially inverted U-shaped cross section and movably straddling the guide rail, the slider main body having a predetermined number of rolling member rolling grooves formed in an inner surface of each of the side walls thereof to respectively oppose corresponding rolling member rolling grooves of the guide rail, the slider main body further having through bores formed in thick wall portions of the side walls serving as rolling member return passages which are in parallel to the rolling member rolling grooves of the slider main body;

end caps respectively joined to opposite ends of the slider main body, each of the end caps having curved passages for respectively bringing the rolling member return passages in communication with the rolling member rolling grooves of the slider main body; and a plurality of rolling members rollably inserted into the opposing rolling member rolling grooves of the guide rail and the slider main body;

the slider main body being formed with the predetermined number of rolling member rolling grooves so that one rolling member rolling groove is formed in the inner surface of one of the side walls and at least one rolling member rolling groove is formed in the inner surface of the other of the side walls in a bilateral asymmetrical fashion.

2. The linear guide table system according to claim 1 wherein the slider main body is formed with a predetermined number of rolling member rolling grooves so that one rolling member rolling groove is formed in the inner surface of one of the side walls and two rolling member rolling grooves are formed in the inner surface of the other of the side walls.

* * * * *